Dec. 19, 1939. B. W. FRY ET AL Re. 21,301

COIN SELECTOR FOR VENDING MACHINES

Original Filed May 13, 1936 2 Sheets-Sheet 1

INVENTORS
BENJAMIN W. FRY
JOHN GOTTFRIED
BY J. S. Cook
ATTORNEY

COIN SELECTOR FOR VENDING MACHINES

Original Filed May 13, 1936 2 Sheets-Sheet 2

INVENTORS
BENJAMIN W. FRY
JOHN GOTTFRIED
BY J. H. Gill
ATTORNEY

Reissued Dec. 19, 1939

Re. 21,301

UNITED STATES PATENT OFFICE 21,301

COIN SELECTOR FOR VENDING MACHINES

Benjamin W. Fry, University City, and John Gottfried, St. Louis, Mo., assignors to National Slug Rejectors, Inc., St. Louis, Mo., a corporation of Missouri Original No. 2,094,788, dated October 5, 1937, Serial No. 79,409, May 13, 1936. Application for reissue August 28, 1939, Serial No. 292,340

6 Claims. (Cl. 194—101)

Our invention relates to a coin selector for vending machines, and has for its primary object to provide a device whereby only genuine coins will be admitted to the vending mechanism of such a machine for the operation thereof. It has been our experience with coin-operated vending machines generally that slugs made of metals other than that employed in genuine coins, but of the same size and shape, will be used to fraudulently operate the vending mechanism. It has also been our experience that at times a slug will be inserted in a vending machine which machine employs a small magnet for sorting out slugs of substantial iron or steel content to prevent said slugs from reaching the vending mechanism. Sometimes a slug may also consist of an iron or steel center and a peripheral hoop of lead, zinc, or other like metal which, if permitted to pass the small magnet without being affected thereby, will usually cause such a slug to clog the mechanism and render the machine inoperative. We have also found that bent coins, sticky or wet coins, and oversize slugs will also tend to clog the mechanism. It will be understood that whatever tends to render the machine inoperative is a serious detriment, as such machine has to be serviced by someone having means or access to the working parts of said machine in order to remove any clogging coin or slug, and such period of inoperativeness is objectionable to the person in whose establishment said vending machine has been located, and who participates in a division of the intake of said machine.

It has also been our experience with such machines that in order deliberately to clog the vending machine a normally good coin will be drilled transversely and a small insert of steel or iron securely fitted into the hole thus drilled. Such a mutilated coin so prepared will pass the ordinary selective devices, including the small magnet, contained in said machine, if said magnet is presented edgewise to said coin, and when it reaches the rather powerful second magnet it will be gripped thereby, due to the steel or iron insert, and thus be retained in the chute through which it is progressing toward the vending operating mechanism, thus effectually blocking the mechanism and rendering the machine inoperative. In order to circumvent the intended effect of such a prepared coin, we have located a small magnet near the inlet opening through which coins are inserted into the vending machine, which magnet operates upon a side face of the coin, and by virtue of the magnetic attraction of such magnet for the steel or iron insert in the coin, such coin is slowed down sufficiently to cause it to be automatically discharged from the mechanism at a point more or less above and away from the vending mechanism.

In a part of our device oversize, bent, or sticky coins or slugs are discharged from the machine without clogging the same by the insertion of a coin through the coin-receiving slot in the machine, or such operation can be manually performed if so desired. The cycle of operation of this part of the mechanism is completed and the parts returned to their normal positions out of the path of travel of the coin immediately following the insertion of said coin through the coin-receiving slot.

In our device we have produced a very simple and compact coin-selective mechanism having relatively few parts and therefore being cheaper to manufacture and service. Vending machines to which our invention relates are those operable by the usual five-cent piece of United States coin money, generally termed a "nickel" coin.

Figure 1:
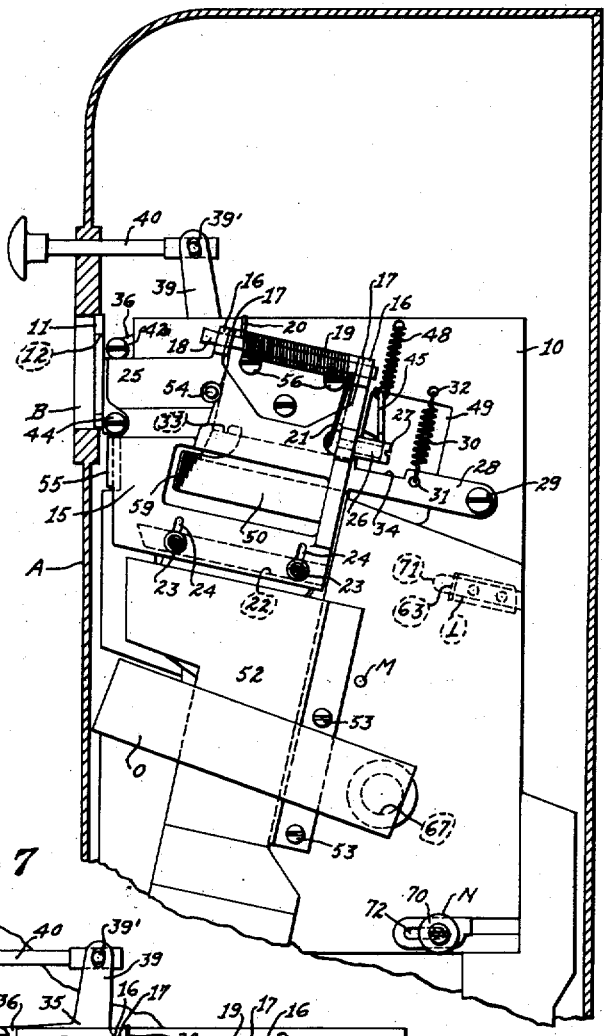
Fig. 1 is a side elevation of our coin selector device with the upper part only of a vending machine casing in cross-section.
Figure 5:
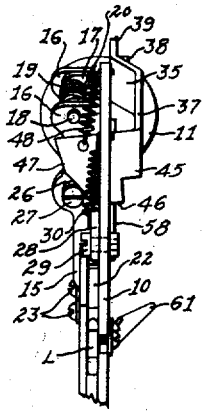
Fig. 5 is a detail end view of the elements of the scavenger device in closed position.
Figure 6:
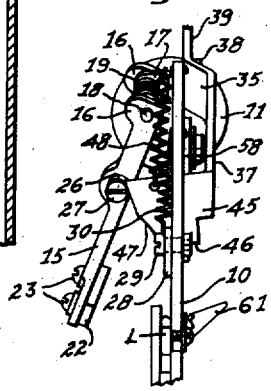
Fig. 6 is a detail end view similar to Fig. 5, with the elements of the scavenger device in open or coin- or slug-discharging position.

A plate 10 is mounted within the vending machine casing A, upon which plate are mounted the elements comprising our selective device. Near the upper end of the outer wall of the casing A is a coin slot B, which is adapted to partly receive the slotted member 11 provided with a slot 12 through which a coin C is adapted to be inserted into the machine. Such member 11 is attached to the plate 10 by means of the screws 13 which pass through an arm 14 integral with the member 11 and are screwed into the plate 10.

Figure 3:
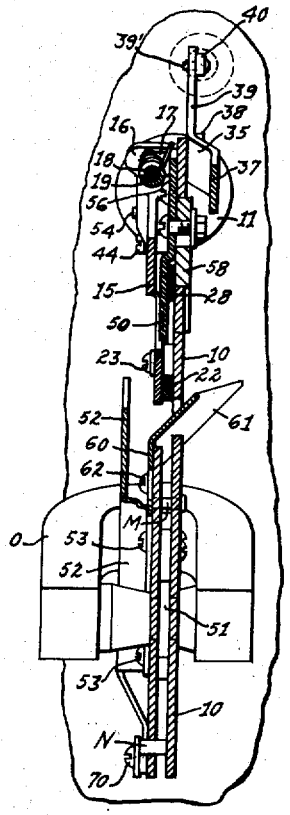
Fig. 3 is a cross-sectional view taken on line 3—3 of Fig. 2, looking in the direction of the arrows.
Figure 4:
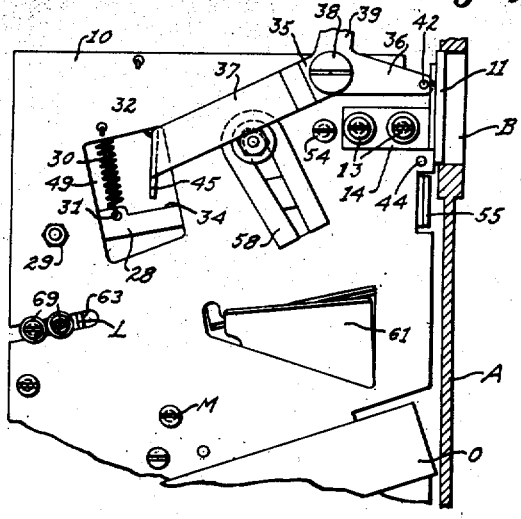
Fig. 4 is a side elevation taken from the side opposite that shown in Figs. 1 and 2.

Hingedly secured to the plate 10 is a member or plate 15 and which is provided with two apertured ears 16 which abut against two apertured lugs 17 on the plate 10, so that the apertures in said ears 16 and said lugs 17 register for the purpose of receiving the pin 18 which secures said plate 15 to the plate 10. A coil spring 19 surrounds this pin 18 with one free end 20 impinging against the plate 10, while the other free end 21 impinges against the outer wall or face of the plate 15 (see Figs. 1 and 7). The spring 19 normally holds the plate 15 in retracted position, as shown most clearly in Figs. 1 and 3.

Figure 7:
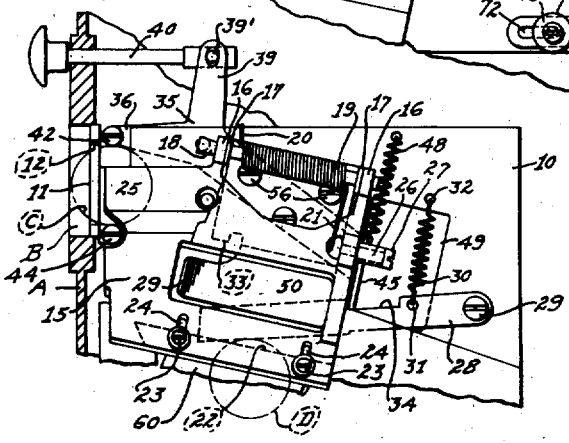
Fig. 7 is a side elevation of the scavenger device showing the same in open or coin- or slug-discharging position caused by the insertion of a coin in the coin-receiving slot in the vending machine.

Near the lower end of the plate 15 and on the inner face thereof is mounted a vertically adjustable, elongated track 22, by means of the two screws 23 which pass through slots 24 in said plate 15 (see Figs. 1 and 7). This track 22 is inclined downwardly from its forward end to its rear end, and serves the function of a track for incoming coins to direct same toward the chute for receiving a coin which, when genuine, will at the proper point in its travel through the mechanism be in position to operate the vending mechanism. The lower inner face of the plate 15 is separated from the inner face of the plate 10 just enough to provide clearance for a normal coin (preferably a nickel), so that said coin may roll along the downwardly inclined elongated track 22 to reach the proper chute, where, at the proper time, it may be in position to operate the vending mechanism.

The forward portion of the plate 15 extends to within a short distance of the inner face of the front of the casing A. The upper projection 25 of the plate 15 projects between two rollers, presently to be described, adjacent the coin-receiving slotted member 11. This projection 25 serves to receive the coin as it passes through the coin slot 12 in the member 11, so that said coin may drop onto the downwardly inclined, elongated track 22, and if a genuine coin it may progress on through the vending operating mechanism of the machine.

On the outer edge of the plate 15 somewhat above the median line thereof a roller 26 is mounted by means of a screw 27 passing longitudinally thereof and into the side edge of said plate 15. The purpose of such roller will be hereinafter described.

Pivoted to the inner face of the plate 10 is a scavenger blade 28 held in position by the screw 29. A coil spring 30 fastened to the blade 28 through the opening 31 and to the plate 10 through the opening 32 holds said blade 28 in its uppermost, retracted position, as shown particularly in Figs. 1 and 2. The upper movement of said blade 28 is stopped by the projection 33 on the plate 10 (see Fig. 2). A notch 34 is provided in the upper side of the blade 28 for a purpose hereinafter to be described. The scavenger blade 28 moves in its lowermost position in the space between the plate 10 and the plate 15 to strike any clogged coin caught at this point.

To operate the plate 15 and the scavenger blade 28, we provide a rocker member 35 having a short arm 36 projecting forwardly and a longer arm 37 projecting rearwardly and pivoted at the juncture of said arms to the plate 10 by the screw 38. In order to permit of a manual operation of this rocker member 35, another upwardly projecting arm 39 is provided to which is attached at 39' a push rod 40 projecting through the vending machine casing A just above the coin slot B. At the forward end of the short arm 36 of the rocker member 35 is a vertically movable roller 41 held in position thereon by the screw 42. This roller 41 projects across the coin slot 12 in the member 11. Beneath this roller 41 is another roller 43 secured to the plate 10 by the screw 44, which last-named roller remains in a fixed position on said plate 10. These two rollers 41 and 43 are separated from each other vertically a space less than the diameter of a five cent coin.

The insertion of a coin through the coin slot 12 to produce the upward movement of the roller 41 rocks the rocker member 35 about its pivot screw 38. At the outer end of the longer arm 37 of the rocker member 35 is a cam member 45 having a relatively straight lower edge 46 adapted to engage the scavenger blade 28 in the notch 34 when contact with said blade 28 is made by the downward movement of the longer arm 37 of the rocker member 35. Another cam face 47 of angular shape is on the cam member 45 and is adapted to contact the roller 26 on the plate 15. The lower angular portion of said cam face 47 first strikes against the roller 26 after which the upper angular portion moves into engagement with said roller 26. The plate 15 is first moved outwardly before the lower end 46 of the cam member 45 contacts the scavenger blade 28 for downward movement thereof. At the upper portion of the cam member 45 a coil spring 48 is secured at one end, while the opposite end of said spring is secured to the plate 10. The purpose of the spring 48 is to hold the rocker member 35 in its uppermost position. The cam member 45 projects through an opening 49 in the plate 10 and the upward movement of said cam member is stopped when the upper edge of said member 45 contacts against the inner upper edge of said opening 49.

In addition to the plate 10, we provide another plate 50 which is spaced from said plate 10 a sufficient distance to provide a passageway for a normal coin, so that it may reach and pass through the chute 51 to operate the vending mechanism (not shown). The space between the plate 50 and the plate 10 is traversed by the scavenger blade 28.

Beneath the plate 15 is another plate 52 secured to the plate 10 by the screws 53 to form a chute for the discharge of a coin or slug which was clogging the regular chute prior to its discharge from the machine. The lower end of such discharge chute permits the discharge of such undesired coin from the vending machine without its passing through the vending mechanism.

When a coin is introduced into the vending machine through the coin slots B and 12 it first contacts with the rollers 41 and 43 immediately adjacent such coin slots. This causes the roller 41 to be moved vertically, thus raising the arm 36 of the rocker member 35 and depressing the arm 37 of said member. This downward movement of the arm 37 carries the cam member 45 at the outer end of said arm 37 downwardly also, and as the inclined edge 47 on said member 45 always is in contact with the roller 26 on the outer edge of the plate 15, such downward movement of said cam member forces the plate 15 outwardly and away from the plate 10. As the cam member continues to move downwardly the lower edge 46 strikes against the upper edge of the scavenger blade 28 at the notched portion 34 thereof. The further downward movement of the cam member 45 forces the scavenger blade 28 downwardly, which causes it to sweep through the space between the plate 50 and the plate 10 and the plate 15, thereby dislodging any coin that may be lodged in such space and causing said coin to be ejected from the machine through the discharge chute provided by the plate 10 and the plate 52.

As soon as the coin has passed between the rollers 41 and 43, the parts just described are immediately returned to their normal retracted positions by the springs 19, 30, and 48, respectively.

If the coin be of normal size it first strikes a small abutment 54 in the path of travel of said coin between the plate 10 and the plate 15, and is deflected forwardly against the member 55 on the plate 10 at the forward edge thereof, which in turn deflects said coin downwardly, rearwardly, and toward the elongated track 22 assisted by the plate 50 attached to the plate 10 by the screws 56. The lower end of this plate 50 has a forward, flared end 59 which serves to direct said coin onto the track 22 on the plate 15. The scavenger blade 28 moves vertically in the space between the plate 10 and the plate 50.

A small magnet 58 is secured to the plate 10 and serves to retard the progress of a coin or slug having therein some material capable of being influenced by a magnet, such as iron or steel. This retardation causes the coin or slug to travel a path which causes it to be rejected by and discharged from the machine.

In order to insure that a bent or oversize coin or slug will properly enter the discharge chute 52, we provide a plate 60 secured to the plate 10. The plate 60 is provided at its upper end with the outturned lip 61, against which said coin may strike to cause it to enter the chute 52. The plate 60 is secured to the plate 10 by the screws 62.

Figure 2:
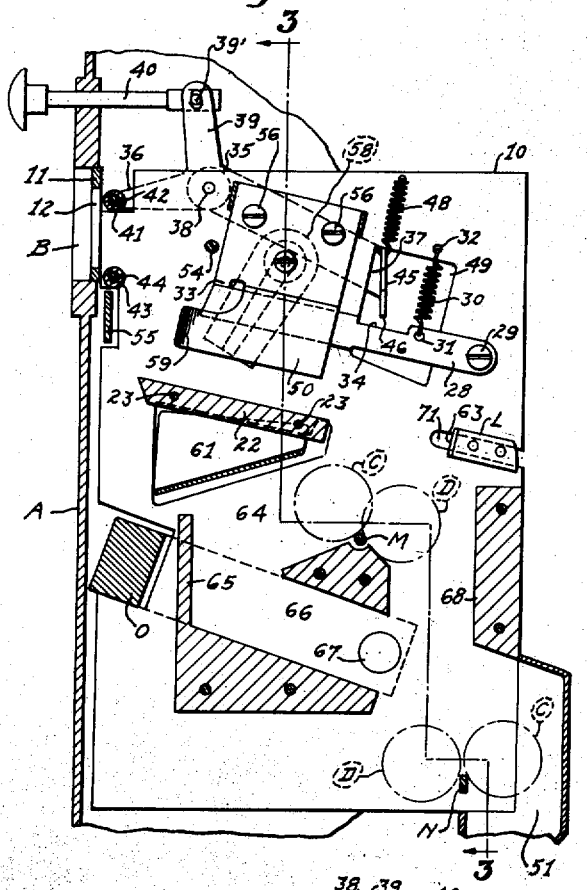
Fig. 2 is a side elevation, partly in section, with the diameter plate of the scavenger device and slug, or imperfect coin, discharge chute therebeneath removed from the device.

A normal five-cent piece rolling down the track 22 strikes against the forward, knife-edged portion 63 of the abutment L (see Fig. 2). This causes the coin to rebound and enter the chute 64 after striking the abutment M. The coin then strikes the upwardly extending plate 65 and is directed into the chute 66, through which it passes between the pole pieces 67 of the large magnet O. As the normal coin discharges from the chute 66 it passes over the abutment N and continues through the chute 51 to the vending operating mechanism of the machine.

A spurious coin D, formed of iron or steel, passing into the machine will be slowed down by the small magnet 58 so that when the next coin is inserted in the coin slot 12 the steel or iron slug will be discharged from the machine by the scavenger blade 28, operating as hereinbefore described. If the spurious coin be formed of type metal, when it strikes the knife edge portion 63 of the abutment L the softness of the metal will cause an imperceptible penetration of said knife edge into the metal, thereby slowing the coin down sufficiently so that said coin will strike on the right-hand side of the abutment M, as shown in Fig. 2. This will cause a discharge of said type metal coin similar to that just heretofore described.

If the spurious coin be formed of a genuine coin with a hole drilled therein into which is inserted a steel or iron piece, the small magnet 58 will retard the onward movement of said coin sufficiently so as to cause said mutilated coin either to be discharged by the scavenger device heretofore described, or to proceed as heretofore described by either missing the abutment L altogether, or if striking the same, not hitting with sufficient force to cause the coin to rebound so that it will pass over the abutment M in order to enter the chute 64. This mutilated coin, if not discharged by the scavenger device, will strike the abutment M on the right thereof, as shown in Fig. 2, rebound against the member 68, and pass to the left of the abutment N to direct it into the discharge apparatus of the machine.

If the coin contain copper or bronze it will, when of normal size, not be subject to retardation by the small magnet 58, but it will strike the abutment L, bounce back, and strike the abutment M on the left side thereof, causing said coin to enter the chute 64, strike the member 65, and enter chute 66, where it will be caused to pass between the pole pieces 67 of the large magnet O. The operation of this large magnet will retard the progress of such a coin containing copper or bronze sufficiently to cause said coin to drop from the discharge end of the chute 66 and strike the abutment N on the left thereof, and be deflected thereby into the discharge mechanism of the vending machine.

We provide adjustment devices 69 and 70 for the abutments L and N which are adapted to operate in slots 71 and 72 in the plate 10. By this means these abutments may be very accurately adjusted so as to operate with a high degree of efficiency.

We claim:

1. A scavenger device for coin-operated mechanisms, comprising a stationary plate, a movable plate having a lower coin runway, said movable plate being mounted on said stationary plate and forming therewith a coin raceway, a magnet mounted on said stationary plate above said coin runway on said movable plate and having its poles arranged to create a magnetic field across said coin path so that disks containing magnetic material will be attracted and held within said magnetic field, a movable blade mounted on said stationary plate and arranged to move across said magnetic field when said movable plate is operated and thereby remove any object lodged within said magnetic field, means for successively operating said movable plate and movable blade, and means for restoring them to their normal, retracted positions.

2. A scavenger device for coin-operated mechanisms, comprising a casing having a coin-receiving slot, a stationary plate secured within said casing, a rocker arm pivoted to said plate and means for operating said rocker arm, a member on one end of said rocker arm, a cam member on the opposite end of said rocker arm, a movable plate having a coin runway, said movable plate being mounted on said stationary plate and forming therewith a coin runway, a magnet mounted on said stationary plate and having its poles arranged to create a magnetic field across said coin path so that disks containing magnetic material will be attracted and held within said magnetic field, a movable blade mounted on said stationary plate and arranged to move across said magnetic field, means consisting of said cam member for successively operating said movable plate and movable blade thereby removing any object lodged between said plates and magnetic field, and means for restoring them to their normal, retracted positions.

3. A scavenger device for coin-operated mechanisms comprising a casing having a coin-receiving slot, a coin chute associated with said coin-receiving slot, a stationary plate secured within said casing, a rocker arm pivoted to said stationary plate, a member on one end of said rocker arm, means for operating said rocker arm, a cam member on the opposite end of said rocker arm, a movable plate mounted on said stationary plate and forming with said stationary plate said coin chute, a magnet mounted on said stationary plate and arranged so that disks containing magnetic material will be attracted and held within the magnetic field created by said magnet while said disks are in said coin chute, a movable blade mounted on said stationary plate and arranged to move between said movable plate and said stationary plate when said movable plate is operated and thereby remove any object lodged between said plates, said movable plate and said movable blade being operated in succession by said cam member when said rocker arm is operated, and means for restoring the rocker arm, movable plate, and movable blade to their normal, retracted positions.

4. A scavenger device for coin-operated mechanisms, comprising a casing having a coin-receiving slot, a coin chute associated with said coin-receiving slot, a stationary plate secured within said casing, a movable plate mounted on said stationary plate and forming with said stationary plate said coin chute, a magnet mounted on said stationary plate and arranged so that disks containing magnetic material will be attracted and held within the magnetic field created by said magnet while said disks are in said coin chute, a movable blade mounted on said stationary plate and arranged to move between said movable plate and said stationary plate when said movable plate is operated and thereby remove any object lodged between said plates, means for operating said movable plate and said movable blade in succession, and means for restoring the movable plate, movable blade, and the operating means therefor to their normal, retracted positions.

5. A scavenger device for coin-operated mechanisms, comprising a casing having a coin-receiving slot, a stationary plate secured within said casing, a rocker arm pivoted to said plate, a member on one end of said rocker arm for operating said arm when engaged by a coin inserted into the coin-receiving slot, a cam member on the opposite end of said rocker arm, a movable plate mounted on said stationary plate and forming therewith a coin guide, a movable blade mounted on said stationary plate and arranged to move between said movable plate and said stationary plate when said movable plate is operated and thereby remove any object lodged between said plates, said movable plate and said movable blade being operated in succession by said cam when said rocker arm is operated, and means for restoring the rocker arm, movable plate, and movable blade to their normal, retracted positions after a coin has been passed through said coin-receiving slot.

6. A scavenger device for coin-operated mechanisms, comprising a stationary plate, a movable plate, a lower coin runway mounted on said movable plate and, together with said movable and stationary plates, forming a coin raceway, a magnet mounted on said stationary plate above said coin runway and having its poles arranged to create a magnetic field across said coin raceway so that discs containing magnetic material will be attracted to and held within said magnetic field, a movable blade mounted on said stationary plate and arranged to move across said magnetic field and thereby remove any object lodged within said magnetic field, actuating means for said movable plate and said movable blade comprising an arm pivoted on the other side of said stationary plate from said movable plate, means for actuating said arm, said stationary plate having an opening therethrough near the end of said arm, and a projection on said arm extending through said opening and having portions engaging both said movable plate and said movable blade, said projection portions, upon actuation of said arm, engaging said movable plate to move it away from said stationary plate, thereby opening said raceway at the bottom thereof, and also engaging said movable blade to sweep it across said magnetic field.

BENJAMIN W. FRY.
JOHN GOTTFRIED.